TRANSDUCING APPARATUS WITH MAGNETIC HEAD MOVING TRANSVERSE TO RECORD MEANS

Filed Dec 8, 1966 3 Sheets-Sheet 1

INVENTOR

Theodore H. Krueger, Jr.
Norman L. Hix

BY De Lio and Montgomery
ATTORNEYS

TRANSDUCING APPARATUS WITH MAGNETIC HEAD MOVING TRANSVERSE TO RECORD MEANS

Filed Dec. 8, 1966 3 Sheets-Sheet 2

INVENTOR
Theodore H. Krueger, Jr.
Norman L. Hix
BY
DeLio and Montgomery
ATTORNEYS

TRANSDUCING APPARATUS WITH MAGNETIC HEAD MOVING TRANSVERSE TO RECORD MEANS

Filed Dec. 8, 1966 3 Sheets-Sheet 3

INVENTOR
Theodore H. Krueger, Jr.
Norman L. Hix
BY
DeLio and Montgomery
ATTORNEYS United States Patent Office 3,523,164
Patented Aug. 4, 1970

3,523,164
TRANSDUCING APPARATUS WITH MAGNETIC HEAD MOVING TRANSVERSE TO RECORD MEANS

Theodore H. Krueger, Jr., Orange, Conn., and Norman L. Hix, Seattle, Wash., assignors to Gametree Inc., New Haven, Conn., a corporation of Connecticut
Filed Dec. 8, 1966, Ser. No. 600,257
Int. Cl. G11b *5/52, 21/04;* G09b *5/04*
U.S. Cl. 179—100.2 12 Claims

ABSTRACT OF THE DISCLOSURE

A device for detecting information recorded on magnetic memory means located on a non-magnetic material comprising a magnetic pick-up head and means for supporting and moving the head back and forth over the memory means. The movable means includes a drive means having a motor pivotally mounted on the device.

This invention relates to sound-producing apparatus and more particularly to apparatus for scanning an area of magnetic memory means to provide an audible signal related to information stored in the magnetic memory means.

It is well known in the prior art that foreign languages may be stored or recorded on records or magnetic tapes which may be played in order to teach the languages or pronunciations of the words of the languages. However, with these types of apparatus there is no visual display of the word as the corresponding phonetic sound is produced, so that there is no correlation in the mind of the listener between the spelling and appearance of the word and the proper pronunication thereof. Additionally, in the conventional record or tape, there is no manner for simultaneously displaying the picture presentation depicting how the tongue must be formed to pronounce the word correctly.

In view of the foregoing, applicant has provided means for simultaneously presenting a word audibly to a listener in conjunction with a visual display representing either the word itself or the manner in which the word is to be formed, or both. This invention provides for the use of a card, roll, or the like of non-magnetic material, preferably flexible, which supports a magnetic memory means on a portion thereof and which also provides for the simultaneous display of the pictorial representation of a word. In addition, this invention provides means for positioning such card, roll or the like, so that it may be scanned by a moving magnetic pick-up head moving across a fixed location magnetic memory means. It has been discovered in this invention that by the use of a backing member positioned on the opposite side of the means supporting the magnetic memory means, with the backing member simultaneously driven with the movement of the head and with the forces supplied by the head and the backing member opposed to each other, considerable improvement in sound reproduction is achieved. It has been determined that by the use of the combination of moving head and moving backing member, the backing member being preferably of resilient material such as felt, sponge rubber, plastic foam, or the like, the magnetic memory means will not wear unevenly. This invention also insures that the contact between the head and the magnetic memory means will not cause a jerking of the head as it moves across to scan the magnetic memory means. Further, it has been found that the use of a movable backing means with the moving head insures that a thin card or roll of paper supporting the magnetic memory means will not become misshapen while being scanned.

Accordingly, it is an object of this invention to provide a new and improved sound-reproducing apparatus.

It is another object of this invention to provide a sound-reproducing apparatus which facilitates the simultaneous visual presentation of a picture or of a written word.

It is another object of this invention to provide means for insuring that the sound reproduced is of an even quality as the magnetic memory means is scanned.

A further object of this invention is to provide new and improved means for positioning a card having the magnetic memory means supported thereby, such card also having a pictorial representation thereof of the word stored in the magnetic memory means.

Yet another object of this invention is to provide new and improved means for positioning a reel of non-magnetic material having a plurality of areas of magnetic memory means positioned thereabout, said reel of non-magnetic material provided with written representations of the information stored in the magnetic memory means in order to simultaneously present the audible information stored in the magnetic memory means while at the same time presenting a pictorial representation of the information stored.

This invention, both as to its organization, method of operation and the objects and advantages thereof, will best be understood by reference to the following specification, taken in connection with the accompanying drawings, in which.

Referring to FIGS. 1–7, there is shown the apparatus for simultaneously displaying a word or picture and for producing an audible representation of the word or picture.

Figures 1, 2:
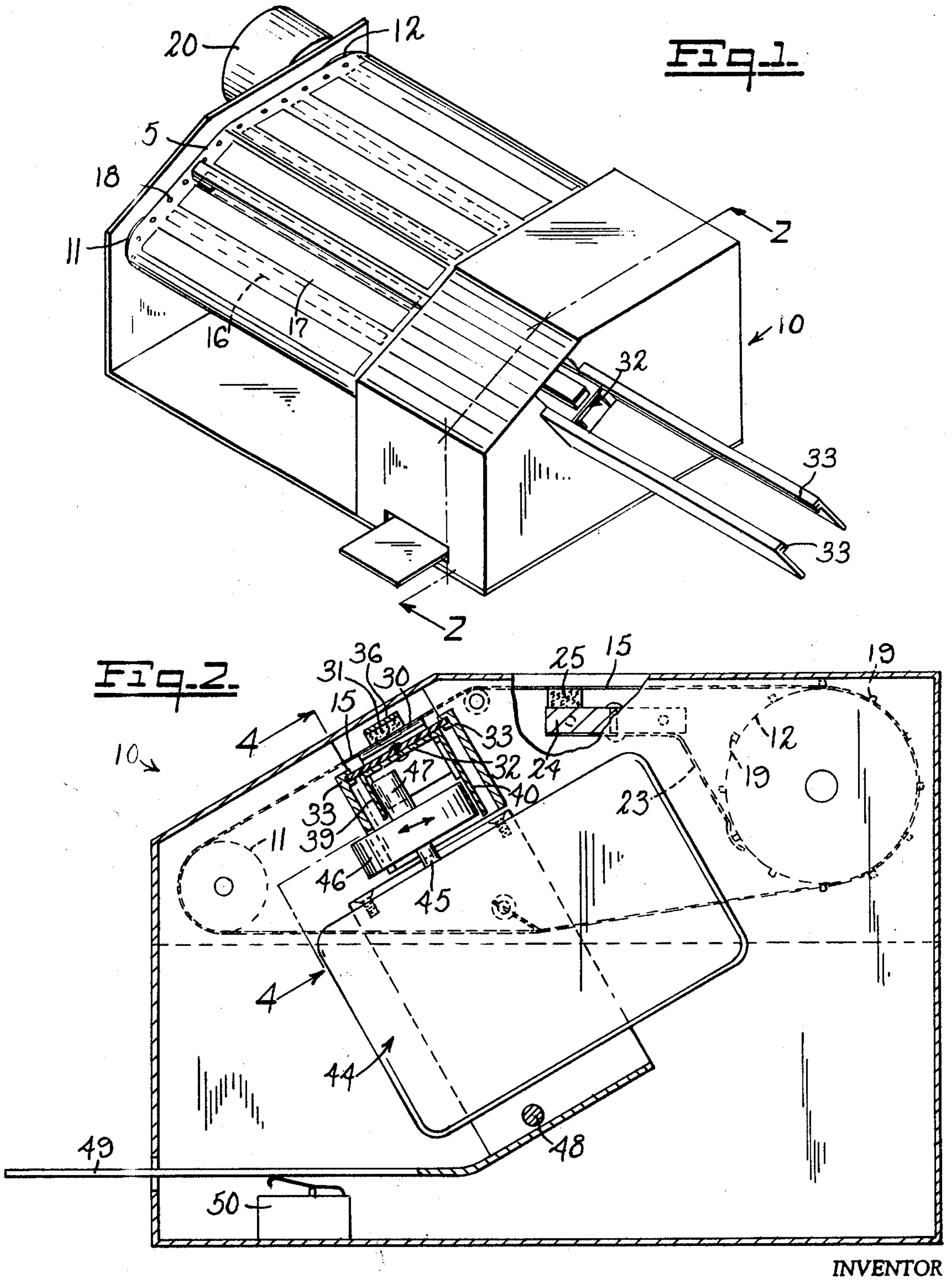
FIG. 1 is a perspective view of the preferred embodimet of this invention.
FIG. 2 is a sectional view taken along line 2—2 of FIG. 1.
Figures 3, 4:
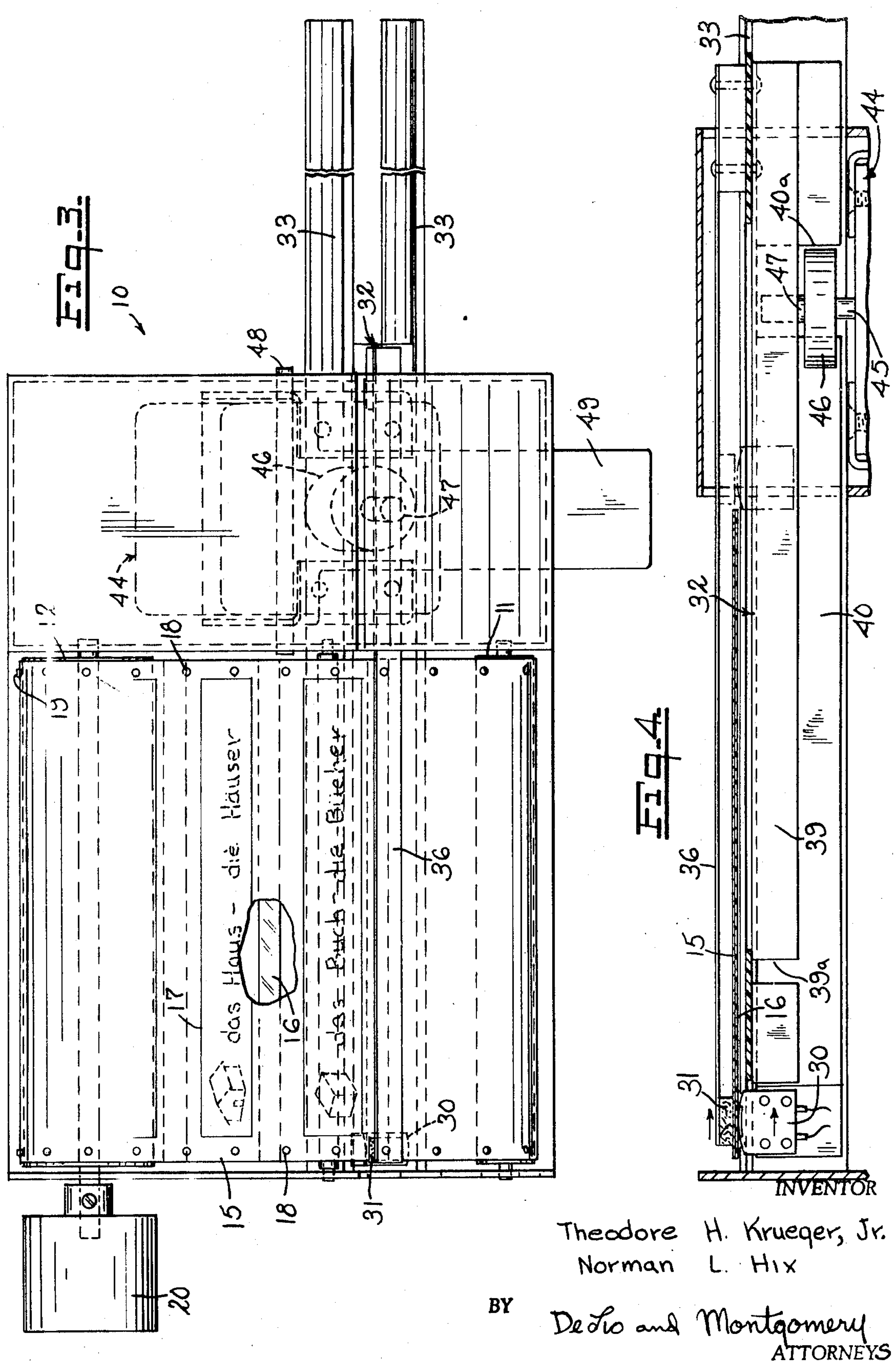
FIG. 3 is a top plan view of FIG. 1.
FIG. 4 is a sectional view taken along line 4—4 of FIG. 2.

The apparatus is shown at 10 and includes means comprising two rolls 11 and 12 for positioning a tape, reel or the like, 15, within the apparatus. In the preferred embodiment, the reel 15 is made of non-magnetic material such as thin paper or cardboard so that it may pass over rolls 11 and 12. The reel 15 supports a plurality of spaced-apart magnetic memory means 16 such as a magnetic tape which has been affixed thereto as, for example A by adhesives. It is to be understood that the magnetic memory means could be magnetic material which has been coated over the paper. Spaced between the memory means, as best seen in FIG. 3, is an area 17 for permitting a picture, word or group of words to be displayed. In this manner, by scanning the magnetic material in which the information is stored, simultaneous audible representation of the word, picture or group of words may be provided. As can be seen, the reel 15 is provided with a plurality of register holes 18 for engaging lugs 19 on the roll 12. The roll 12 may be moved by the provision of the knob 20, as in the manner normal to typewriters and the like. As shown in the diagram, the areas of magnetic memory means are positioned on one side of the paper and as shown in FIG. 1, whereas the picture representations are on the opposite side of the paper. It is to be understood that if desired, both the picture and the magnetic memory means may be positioned on the same side of the paper. Additionally, although not shown in FIG. 1, a cover may be provided over reel 15 so that only the picture or words which are in register with the information contained in the magnetic memory means will be presented.

The mechanism for driving the reel 15 includes a detent shown at 23 which is supported from the side of the casing 10 by a member 24. The detent limits the movement of the roll 12 such that the reel 15 will remain stationary. There is also shown, supported by the member 24, a wiper means 25 comprising a soft material such as sponge rubber, felt or the like, which may be used to wipe the magnetic memory means to insure that it is clean before being positioned for scanning.

In order to read out the information stored on the magnetic memory means, there is provided a magnetic pick-up head 30. The head 30 may be of the type sold by Nortronics and is preferably a single track read out head. Additionally, any type of read out head commonly utilized in the tape recording art may be used for the purposes of this invention.

Positioned directly opposite the top portion of the head 30 and in an opposed relationship thereto, is provided a resilient backing material means 31. The backing material means 31 may comprise materials such as felt, rubber, foam plastics or the like, so long as the material provides a sufficient degree of resilience to insure that the magnetic memory means is forced against the head 30. It has been discovered that the use of the two opposed members, both of which are moved simultaneously, will insure a constant scanning speed even if the supporting material for the magnetic memory means is thin and flexible. It has also been discovered that a uniform pressure is provided by the use of the head and the backing means when used in an opposed relationship and that a reduction in friction is obtained between the head and the magnetic memory means as it is scanned. The head 30 is supported by a member 32 which rides in guides 33, said member 32 having a top bar 36 for supporting the resilient backing means 31. The resilient backing means 31 is positioned with respect to the head, such that when the magnetic memory means is positioned therebetween the resilient material will be slightly depressed, thereby assuring that the magnetic memory means will always ride against the top of the head 30.

In order to move the head and the resilient material back and forth over the magnetic memory means, the member 32 is provided with two sides 39 and 40. These two sides have cut-outs 39*a* and 40*a*, respectively. There is also provided a motor and gear arrangement 44 having a drive shaft 45. The shaft 45 has mounted thereon two drive wheels 46 and 47. The wheel 46 engages side 40 and the smaller wheel 47 engages the shorter side 39. The motor is pivotally mounted at 48 and is positioned by a lever 49. By moving the lever 49 in either of two directions, the wheels 46 and 47 may engage the sides 39 and 40 to drive the head and the backing means back and forth over the memory means. The cut-outs 39*a* and 40*a* are provided for insuring that the head and the resilient backing means will stop as they travel in either of the two directions, since the wheels 46 and 47 will fall into these cut-outs when the head reaches the extent of its travel in either direction.

As may be seen, the lever 49 is in position to close a switch 50 which may be used to control the power to the magnetic head and an amplifier for reproducing the information stored in the magnetic memory means.

In the embodiment shown in FIGS. 1–6, the smaller drive wheel 47 is used to drive the head across the magnetic memory means by positioning lever 49 downwardly. At the same time, the lever 49 closes the switch 50 to provide power to the magnetic head of the amplifier. To return the head to a position to read once again, lever 49 is raised, such that the drive wheel 46 engages the side

40 and returns the head to a position to read out information once again.

Figures 5, 6, 7:
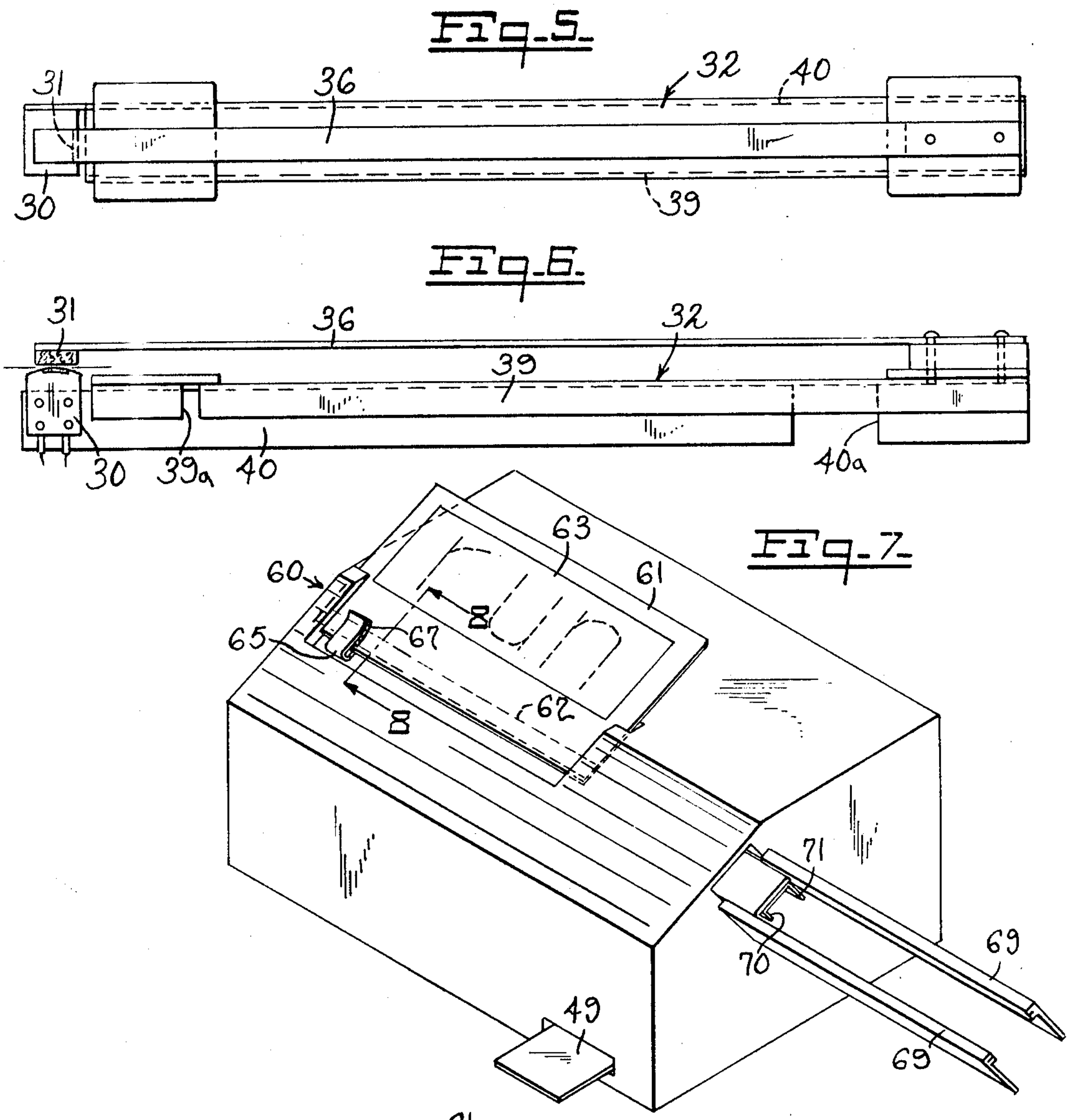
FIG. 5 is a top plan view of the head assembly used in FIGS. 1–4.
FIG. 6 is a side view of FIG. 5.
FIG. 7 is a perspective view of an alternate embodiment of this invention.
Figure 8:
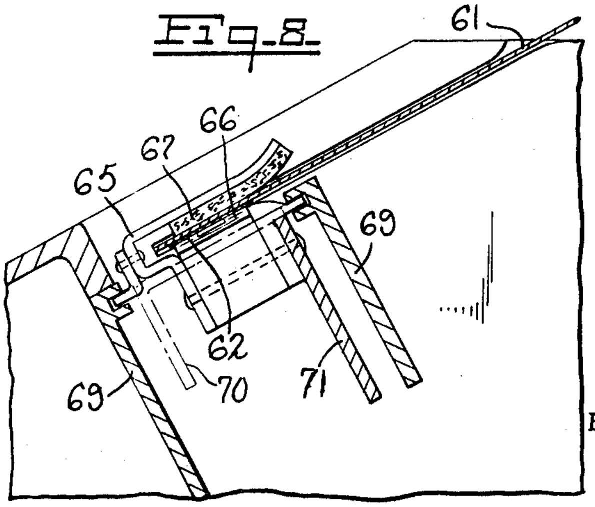
FIG. 8 is a sectional view taken along line 8—8 of FIG. 7.

Referring now to FIGS. 7 and 8, there is shown an alternate embodiment of the invention. In this embodiment there is provided, as shown generally at 60, means for holding a card 61 which is provided with a magnetic memory means 62 and a portion thereof is provided at 63 for displaying a word or symbol corresponding to the information stored in the magnetic memory means 62. The holder means for scanning the magnetic memory means on the card is shown more particularly in the sectional view of FIG. 8, wherein there is provided a support means 65 for retaining a magnetic reading head 66 and a resilient backing means 67 in an opposed relationship. By the use of member 65, the top bar 36, shown in FIGS. 1–6, may be eliminated. The card 61 may be of a soft paper material and this invention is particularly adaptable to using such a card, although it is to be understood that if desired, a harder material card may be utilized with this invention. The support means 65 is supported in guide means 69 and is provided with two side members 70 and 71, respectively. The side members 70 and 71 are of the type shown in FIGS. 1–6 and are positioned to be driven by the motor, as shown in FIGS. 1–6.

Figure 9:
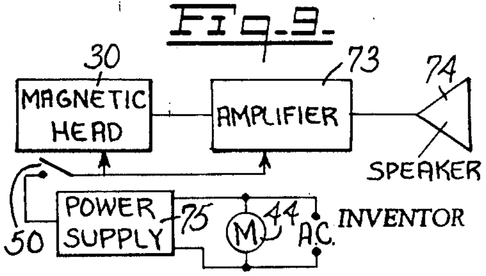
FIG. 9 is a systems electrical diagram for the embodiments of FIGS. 1–8.

Referring now to FIG. 9, there is shown a system diagram for providing an audible signal representative of the information stored on the magnetic memory means. As may be seen, the magnetic head is shown at 30, a read out amplifier is shown at 73 and a speaker at 74. The motor is shown at 44 and a power supply for the head of the amplifier is shown at 75. The previously-mentioned switch 50 is shown in the diagram between the power supply and the head of the amplifier. In order to operate the system, alternating current power is turned on and the motor is started. By moving the lever, the head can be positioned such that it may read out the information stored in the magnetic memory means. To read out the information, the lever 49 is depressed and the head will scan the magnetic memory means while, at the same time, power will be provided to the magnetic head of the amplifier so that an audible signal will be provided from the speaker 74.

It should be understood that the system herein could be modified such that it could be used to record information on the magnetic memory means at the same time. This could be accomplished by the provision of a microphone attached to an amplifier and the magnetic head. A read-in magnetic head could be used in this case to accomplish this result.

It may thus be seen that the objects set forth above, among those made apparent from the preceding description are efficiently obtained and since certain changes may be made in the above constructions without departing from the spirit and scope of the invention, it is intended that all matter contained in the foregoing description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, may be said to fall therebetween.

What is claimed is:

1. Apparatus for acting upon magnetic memory means, comprising a magnetic pick-up head, positioning means for positioning an area of said magnetic memory means adjacent said head, support means for supporting said head and having two side members thereon, each side member having an opening therein such that said openings are spaced a substantial distance from each other along the longitudinal axis of said support means, drive means for acting upon only one of said side members at any given time so as to move said support means, and selective means for permitting said drive means to contact either of said side members.

2. Apparatus according to claim 1, wherein said magnetic memory means includes registry means for positioning the magnetic memory means on said positioning means.

3. Apparatus according to claim 1, in which said means for positioning said magnetic memory means comprises means for supporting a length of supporting material having discrete areas of magnetic memory material affixed thereto.

4. Apparatus according to claim 3, in which said length of supporting material is in the form of a roll.

5. Apparatus according to claim 1, in which there is provided guide means for supporting said support means, said guide means permitting said support means to move thereon so that the head may scan the magnetic memory means, wherein said drive means for moving said support means includes a motor which rotates two drive wheels such that one wheel can contact one side member and the other wheel can contact the other side member, and wherein said selective means is used to alternately position each wheel with its respective side member.

6. Apparatus according to claim 5, wherein said selective means comprises pivotally mounting said motor in said apparatus, a lever attached to said motor so that by manual movement of said lever said motor is pivoted, whereby the appropriate wheel may contact its respective side member to move the support member until said wheel passes into the opening in said side member to disengage said wheel from said side member.

7. Apparatus according to claim 1, including backing means positioned on said support means such that said magnetic memory means passes between said head and said backing means, wherein said means for positioning said magnetic memory means comprises means for supporting a card having areas of magnetic memory material secured thereto.

8. Apparatus according to claim 7, in which the backing means includes a resilient material in order to force the magnetic memory means against the head.

9. Apparatus according to claim 7, in which the backing means comprises felt material.

10. Apparatus according to claim 7, including means for wiping the surface of the magnetic memory means prior to its being presented to said head.

11. A device for detecting information recorded on magnetic memory means supported by a non-magnetic material, comprising a movable magnetic pick-up head and means for supporting and moving said head back and forth over said memory means, said means for moving the head comprising pivotally mounted drive means which includes a motor pivotally mounted in said device, such that when said drive means is positioned in one direction it causes the head to move across said memory means and when positioned in another direction it causes said head to move back toward its initial starting position.

12. A device according to claim 11, including means for pivoting said motor.

References Cited

UNITED STATES PATENTS

| | | | |
|---|---|---|---|
| 2,990,182 | 6/1961 | Cailliot | 179—100.2 |
| 3,176,083 | 3/1965 | Hallser | 179—100.2 |
| 3,185,776 | 5/1965 | Bender | 179—100.2 |
| 3,372,242 | 3/1968 | Garrett | 179—100.2 |

BERNARD KONICK, Primary Examiner

J. RUSSELL GOUDEAU, Assistant Examiner

U.S. Cl. X.R.

35—35; 340—174.1